United States Patent
Janssen

(10) Patent No.: US 12,508,523 B2
(45) Date of Patent: *Dec. 30, 2025

(54) LAUNDER COVER SYSTEM

(71) Applicant: Jerry D. Janssen, Barnesville, MN (US)

(72) Inventor: Jerry D. Janssen, Barnesville, MN (US)

(*) Notice: Subject to any disclaimer, the term of this patent is extended or adjusted under 35 U.S.C. 154(b) by 341 days.

This patent is subject to a terminal disclaimer.

(21) Appl. No.: 18/365,457

(22) Filed: Aug. 4, 2023

(65) Prior Publication Data

US 2023/0372842 A1 Nov. 23, 2023

Related U.S. Application Data

(63) Continuation of application No. 17/992,082, filed on Nov. 22, 2022, now Pat. No. 11,717,773, which is a continuation of application No. 17/365,169, filed on Jul. 1, 2021, now Pat. No. 11,511,215, which is a continuation of application No. 16/899,111, filed on Jun. 11, 2020, now Pat. No. 11,052,329.

(51) Int. Cl.
*B01D 21/24* (2006.01)
*B01D 21/00* (2006.01)

(52) U.S. Cl.
CPC ..... *B01D 21/0072* (2013.01); *B01D 21/0003* (2013.01); *B01D 21/0006* (2013.01); *B01D 21/0042* (2013.01); *B01D 21/2444* (2013.01)

(58) Field of Classification Search
CPC ............ B01D 21/0003; B01D 21/0042; B01D 21/0072; B01D 21/2444
See application file for complete search history.

(56) References Cited

U.S. PATENT DOCUMENTS

| | | |
|---|---|---|
| 4,391,704 A | 7/1983 | Anderson |
| 4,767,536 A | 8/1988 | Roley |
| 5,252,205 A | 10/1993 | Schaller |
| 5,670,045 A | 9/1997 | Schaller |
| 5,965,023 A | 10/1999 | Schaller |
| 6,216,881 B1 | 4/2001 | Schaller |
| 6,712,222 B2 | 3/2004 | Schaller |
| 7,473,358 B1 | 1/2009 | Schaller |
| 7,556,157 B2 | 7/2009 | Schaller |
| 7,591,381 B2 | 9/2009 | Schaller |
| 9,339,742 B2 | 5/2016 | Schaller |

(Continued)

FOREIGN PATENT DOCUMENTS

DE 4226709 A1 2/1994

*Primary Examiner* — Bradley R Spies
(74) *Attorney, Agent, or Firm* — Neustel Law Offices

(57) ABSTRACT

A launder cover system for reducing or eliminating sunlight exposure so as to prevent algae growth in a tank such as a clarifier tank. The launder cover system generally includes a plurality of support members and a plurality of launder covers which are each independently pivotably connected to a tank wall of a tank, such as by using a mount. The support members are each pivotably connected to the tank wall by a pivot connector and the launder covers are each pivotably connected to the tank wall by a hinge connector. Each support member is positioned between a pair of launder covers, and each launder cover is positioned between a pair of support members. The support members function to support the launder covers in a raised or lowered position. A launder support may be connected to the channel wall to support the launder covers in their lowered positions.

19 Claims, 13 Drawing Sheets

(56) References Cited

U.S. PATENT DOCUMENTS

| | | |
|---|---|---|
| 9,873,068 B2 | 1/2018 | Schaller |
| 9,919,244 B2 | 3/2018 | Heimdal |
| 10,370,813 B2 | 8/2019 | Obermeyer |
| 11,052,329 B1 | 7/2021 | Janssen |
| 11,511,215 B2 | 11/2022 | Janssen |
| 2013/0277301 A1 | 10/2013 | Schaller |
| 2016/0236116 A1 | 8/2016 | Schaller |
| 2018/0036654 A1 | 2/2018 | Schaller |
| 2021/0046404 A1 | 2/2021 | Morgan |

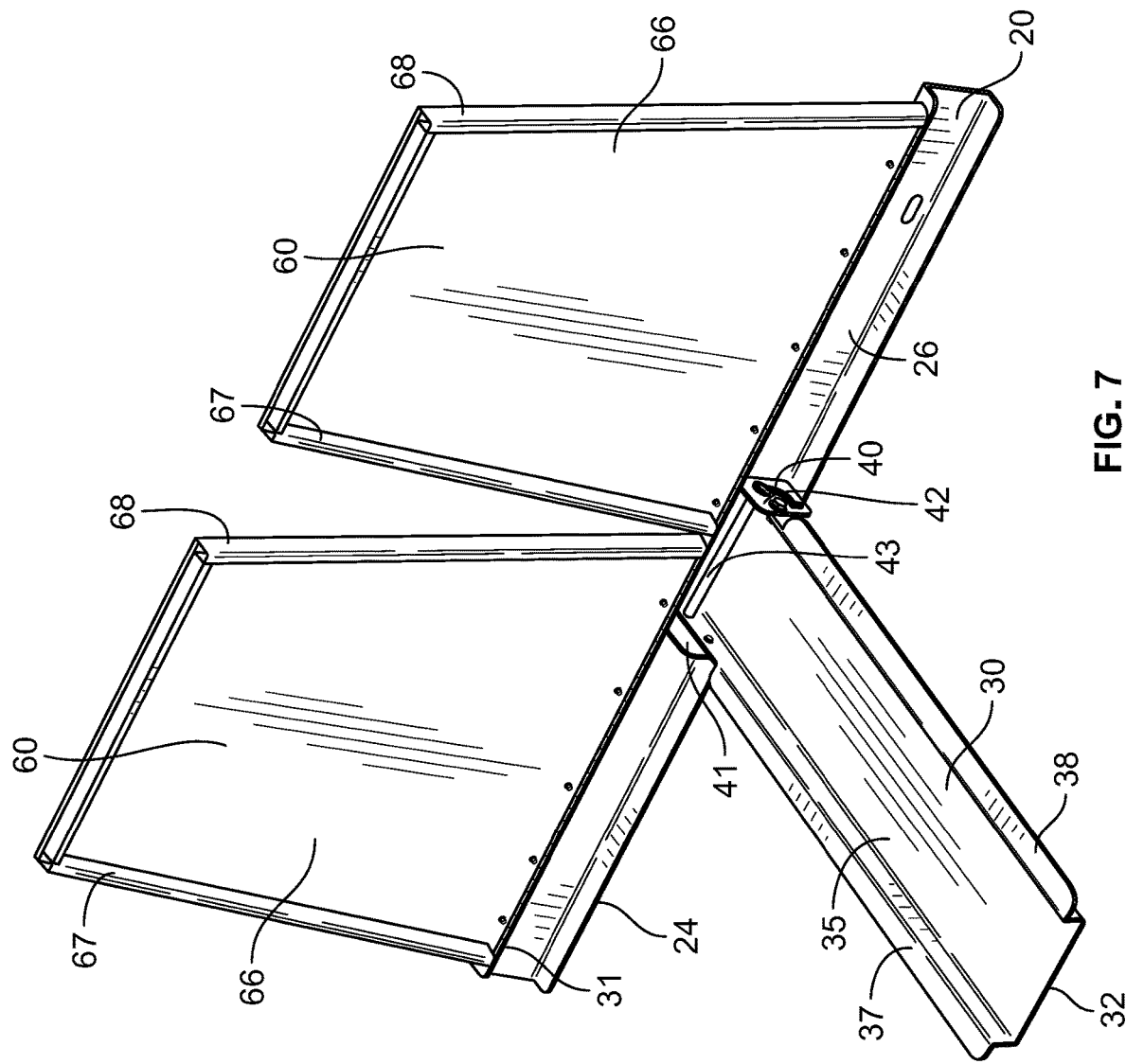

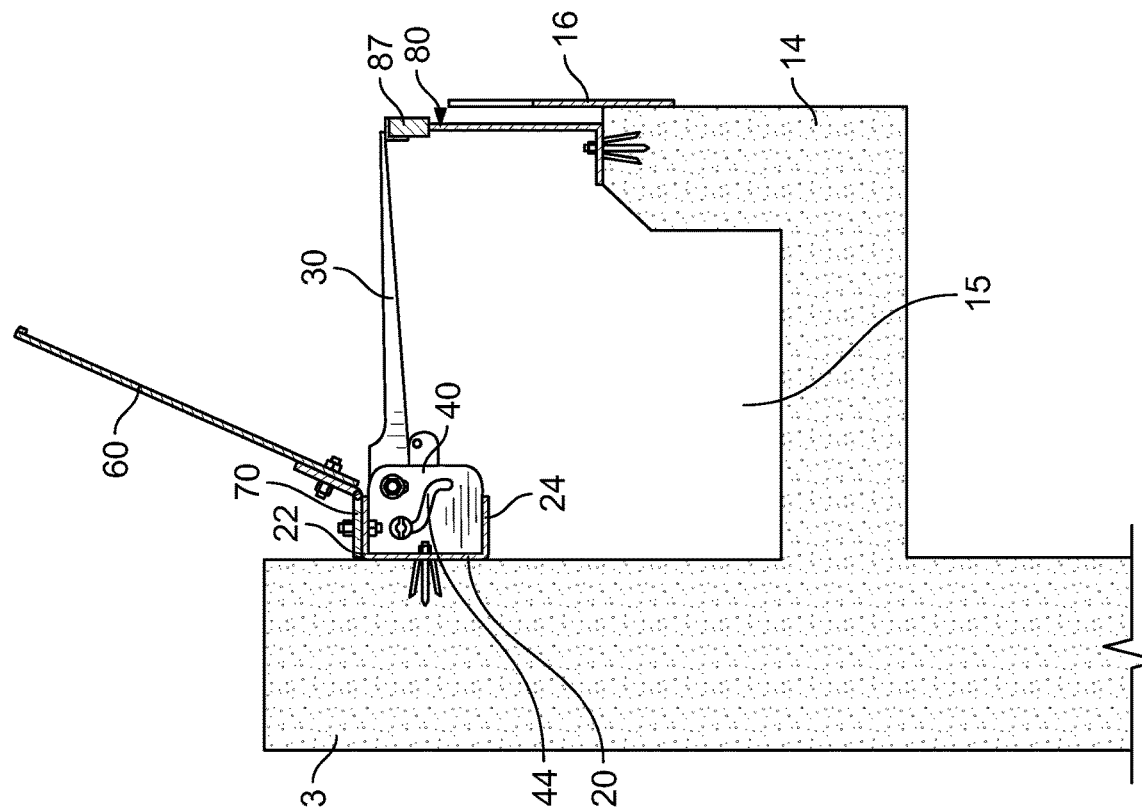
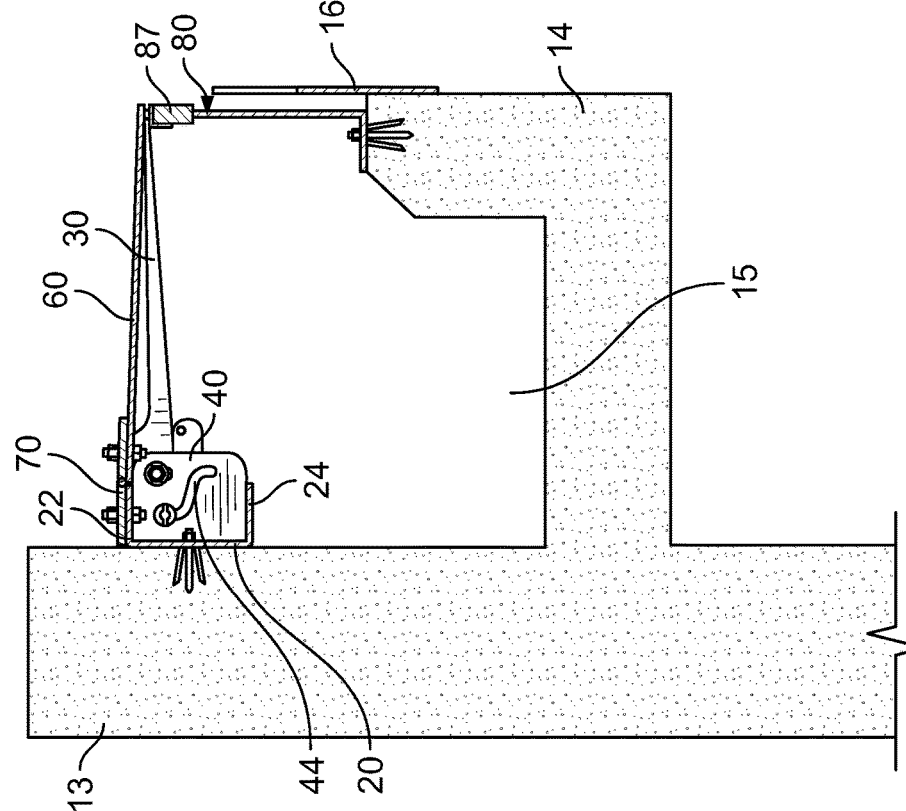

LAUNDER COVER SYSTEM

CROSS REFERENCE TO RELATED APPLICATIONS

The present application is a continuation of U.S. application Ser. No. 17/992,082 filed on Nov. 22, 2022, which is a continuation of U.S. application Ser. No. 17/365,169 filed on Jul. 1, 2021 now issued as U.S. Pat. No. 11,511,215, which is a continuation of U.S. application Ser. No. 16/899,111 filed on Jun. 11, 2020 now issued as U.S. Pat. No. 11,052,329. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a launder cover system for reducing or eliminating sunlight exposure so as to prevent algae growth in a tank such as a clarifier tank.

Related Art

Any discussion of the related art throughout the specification should in no way be considered as an admission that such related art is widely known or forms part of common general knowledge in the field.

Fluid tanks such as clarifier or settling tanks are in common use throughout the world. Clarifier tanks generally include mechanical devices for continuously removing solids which become deposited by sedimentation. The clarifier tank will typically be sued to remove solid particulates or suspended solids from fluids. Concentrated impurities known as sludge are discharged from the bottom of the tank and particles known as scum float to the surface of the fluids for easy removal.

Clarifier tanks are typically positioned outdoors. Thus, most clarifier tanks are directly or indirectly exposed to sunlight for a large portion of an average day. The sunlight exposure can lead to algae growth within the clarifier tank, which can inhibit its operation as well as lead to undesirable aesthetics or odors. Algae growth can also result in unacceptable discharge water quality.

In an effort to combat such algae growth, clarifier tanks may be designed to include launder covers, which are configured to cover a portion of the surface of the fluids to prevent or inhibit algae growth. Such launder covers are typically positioned on the edge of the tank so as to cover the baffle, weir, and effluent launder of the clarifier tank.

In the past, fiberglass reinforced plastic covers have been utilized which tend to fade and deteriorate in the sun. Further, where launder covers are adjustable, they have typically required brackets or other securing devices being installed on the weir of the clarifier tank that can be difficult to adjust or operate without reaching over the tank to access the weir.

SUMMARY

An example embodiment is directed to a launder cover system. The launder cover system includes a plurality of support members and a plurality of launder covers which are each independently pivotably connected to a tank wall of a tank, such as by using a mount. The support members are each pivotably connected to the tank wall by a pivot connector and the launder covers are each pivotably connected to the tank wall by a hinge connector. Each support member is positioned between a pair of launder covers, and each launder cover is positioned between a pair of support members, with the launder covers and support members encircling the tank. The support members function to support the launder covers in a raised or lowered position. A launder support may be connected to the channel wall to support the launder covers in their lowered positions.

There has thus been outlined, rather broadly, some of the embodiments of the launder cover system in order that the detailed description thereof may be better understood, and in order that the present contribution to the art may be better appreciated. There are additional embodiments of the launder cover system that will be described hereinafter and that will form the subject matter of the claims appended hereto. In this respect, before explaining at least one embodiment of the launder cover system in detail, it is to be understood that the launder cover system is not limited in its application to the details of construction or to the arrangements of the components set forth in the following description or illustrated in the drawings. The launder cover system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 7 is a perspective view of a launder cover system with a pair of launder covers in a raised position and a central support member in a lowered position in accordance with an example embodiment.

FIG. 11 is a side sectional view of a launder cover system with the support member and launder cover in the lowered position in accordance with an example embodiment.

FIG. 12 is a side sectional view of a launder cover system with the support member and launder cover in the raised position in accordance with an example embodiment.

DETAILED DESCRIPTION

A. Overview

Figure 1:
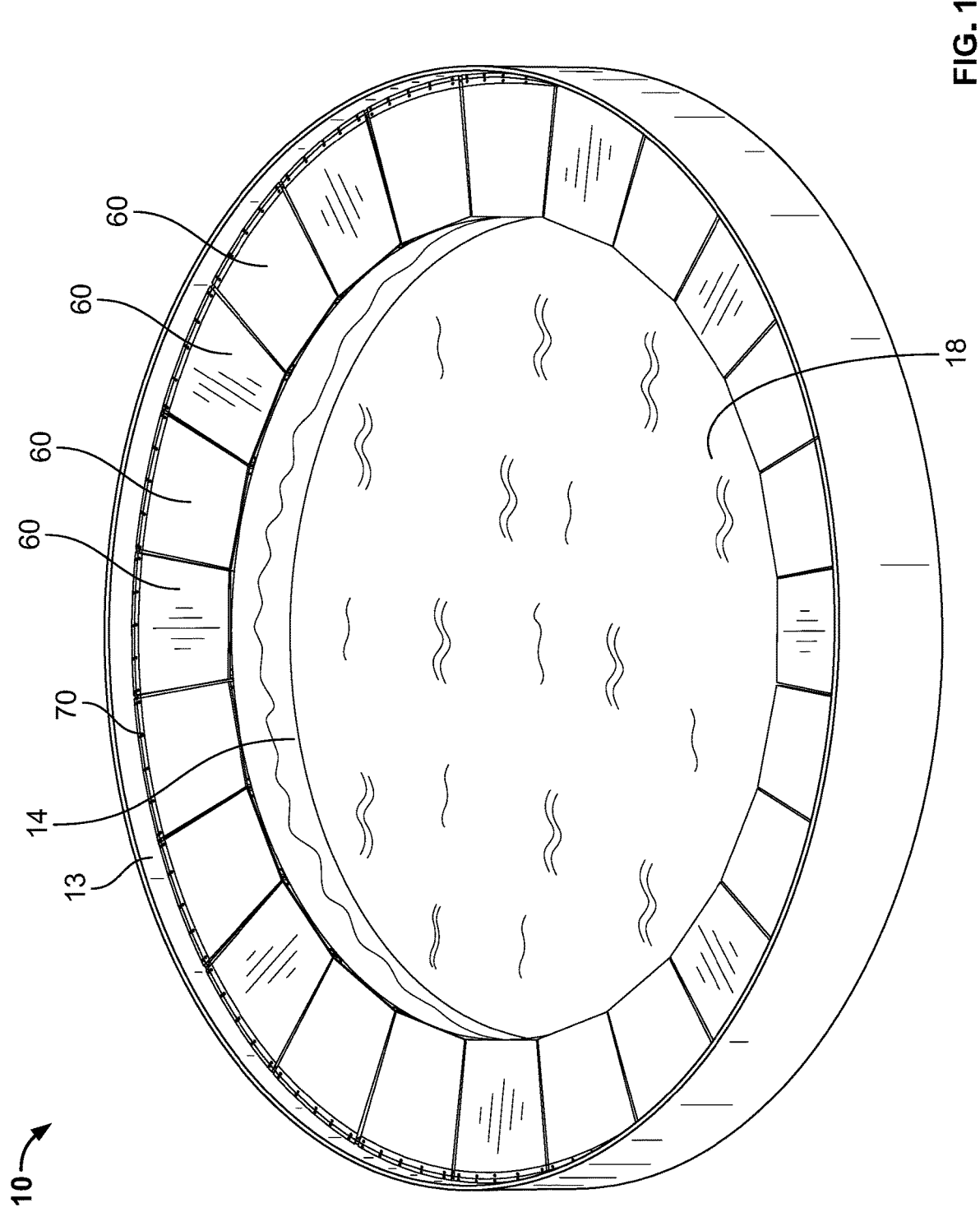
FIG. 1 is a perspective view of a launder cover system with all support members and launder covers being lowered in accordance with an example embodiment.

An example launder cover system 10 generally comprises a support member 30 adapted to be pivotably connected to a tank wall 13 of a tank 12, wherein the support member 30 is adjustable between a raised position and a lowered position; and a launder cover 60 adapted to be pivotably connected to the tank wall 13, wherein at least a portion of the support member 30 is positioned underneath the launder cover 60, wherein the launder cover 60 and the support member 30 are each independently pivotable with respect to the tank wall 13; wherein the launder cover 60 is adjustable between a first position and a second position, wherein in the first position the launder cover 60 is adapted to cover a launder channel 15 of the tank 12, wherein in the second position the launder cover 60 is adapted to expose the launder channel 15 of the tank 12; wherein the support member 30 is adapted to support the launder cover 60 in the first position when the support member 30 is in the lowered position, wherein the support member 30 is adapted to support the launder cover 60 in the second position when the support member 30 is in the raised position.

A hinge connector 70 may be connected between the tank wall 13 and the launder cover 60. The tank wall 13 may comprise a mount 20 connected to the tank wall 13, with the hinge connector 70 being connected to the mount 20. The hinge connector 70 may comprise a first member 71, a second member 72, and a hinge 73 between the first member 71 and the second member 72, wherein the first member 71 is connected to the mount 20 and the second member 72 is connected to the launder cover 60.

A pivot connector 40 may be connected between the tank wall 13 and the support member 30. The pivot connector 40 may be connected to a mount 20 of the tank wall 13. The pivot connector 40 may comprise a support rod 52 for supporting the support member 30 in the lowered position. The pivot connector 40 may alternative comprise a pair of support brackets for supporting the support member 30 in the lowered position.

The pivot connector 40 may comprise a linkage 43 movably connected within a slot 44 so as to guide movement of the support member 30. The slot 44 may comprise an arc portion 46 and a vertical portion 47, with the arc portion 46 being adapted to guide movement of the support member 30 and the vertical portion 47 being adapted to lock the support member 30 in the raised position.

A launder support 80 may be connected to a channel wall 14 of the launder channel 15, wherein the launder cover 60 is adapted to rest upon the launder support 80 when the launder cover 60 is in the first position. The launder support 80 may comprise a rail 87 on which the launder cover 60 rests when the launder cover 60 is in the first position. The rail 87 may be adapted to be raised or lowered. The launder support 80 may comprise a pair of threaded connectors 84a, 84b for raising or lowering the rail 87 based on the height of the baffles of the tank 12.

Another exemplary embodiment of a launder cover system 10 may comprise a mount 20 adapted to be connected to a tank wall 13 of a tank 12; a first launder cover 60 pivotably connected to the mount 20, wherein the first launder cover 60 is adjustable between a first position and a second position, wherein in the first position the first launder cover 60 is adapted to cover a launder channel 15 of the tank 12, wherein in the second position the first launder cover 60 is adapted to expose the launder channel 13 of the tank 12, wherein the first launder cover 60 comprises a first side 63 and a second side 64; a first support member 30 pivotably connected to the mount 20, wherein at least a portion of the first support member 30 is positioned underneath the first side 63 of the first launder cover 60, wherein the first support member 30 is adjustable between a raised position and a lowered position; and a second support member 30 pivotably connected to the mount 20, wherein at least a portion of the second support member 30 is positioned underneath the second side 64 of the first launder cover 60, wherein the second support member 30 is adjustable between a raised position and a lowered position; wherein the first launder cover 60, the first support member 30, and the second support member 30 are each independently pivotable with respect to the mount 20; wherein the first support member 30 and the second support member 30 are each adapted to support the first launder cover 60 in the first position when the first support member 30 and the second support member 30 are in the lowered position, wherein the first support member 30 and the second support member 30 are each adapted to support the first launder cover 60 in the second position when the first support member 30 and the second support member 30 are in the raised position. A second launder cover 60 may be pivotably connected to the mount 20, with at least a portion of the first support member 30 being positioned underneath the second launder cover 60.

The launder cover system 10 is generally utilized to provide selective covering of portions of a tank 12 so as to restrict sunlight exposure and inhibit algae growth within a fluid 18 stored within the tank 12. The tank 12 will generally include a tank wall 13 having an inner perimeter and a channel wall 14 such as a weir wall which is distally-spaced with respect to the inner perimeter of the tank wall 13 so as to define a launder channel 15 such as an effluent launder. A weir 16 may be connected to the channel wall 14 such as shown in FIGS. 11 and 12. Although not shown for clarity, a baffle will generally be positioned adjacent to the weir 16. The baffle will generally be mounted by hanger brackets or the like and extend below the water level only partially (such as six inches below water level) such that water may flow underneath the baffle, and then over the adjacent weir 16. The upper end of the tank wall 13 may be submerged within the fluid 18 such as shown in FIGS. 1-4. Any type of fluid 18 may be stored in the tank 12, including but not limited to water.

It should be appreciated that the launder cover system 10 may be utilized to selectively cover a wide range of tanks 12 including but not limited to a clarifier tank as shown in the figures. As shown in the figures, the launder cover system 10 includes a plurality of launder covers 60 which are each adapted to selectively cover a portion of the tank 12. More specifically, the launder covers 60 are generally adapted to selectively cover the launder channel 15 of the tank 12.

B. Mount

As shown throughout the figures, the launder cover system 10 is generally connected to a tank 12 so as to prevent or inhibit algae growth from sunlight exposure, particularly in the area of the effluent launder 15. The launder cover system 10 may include both launder covers 60, which are adjustable so as to selectively cover a portion of the tank 12, and support members 30, which are utilized to support the launder covers 60 both in their raised and lowered positions.

As shown in FIGS. 1-9b, both the support members 30 and the launder covers 60 of the launder cover system 10 are hingedly or pivotably connected to the tank wall 13 of the tank 12. The manner in which the support members 30 and launder covers 60 are connected to the tank wall 13 may vary. In the exemplary embodiment shown in the figures, a mount 20 is connected to the tank wall 13. Generally, the mount 20 will extend around the entire circumference or inner perimeter of the clarifier tank 13 so that the entire circumference or inner perimeter of the clarifier tank 13 may be selectively covered by the launder covers 60.

Figure 5:
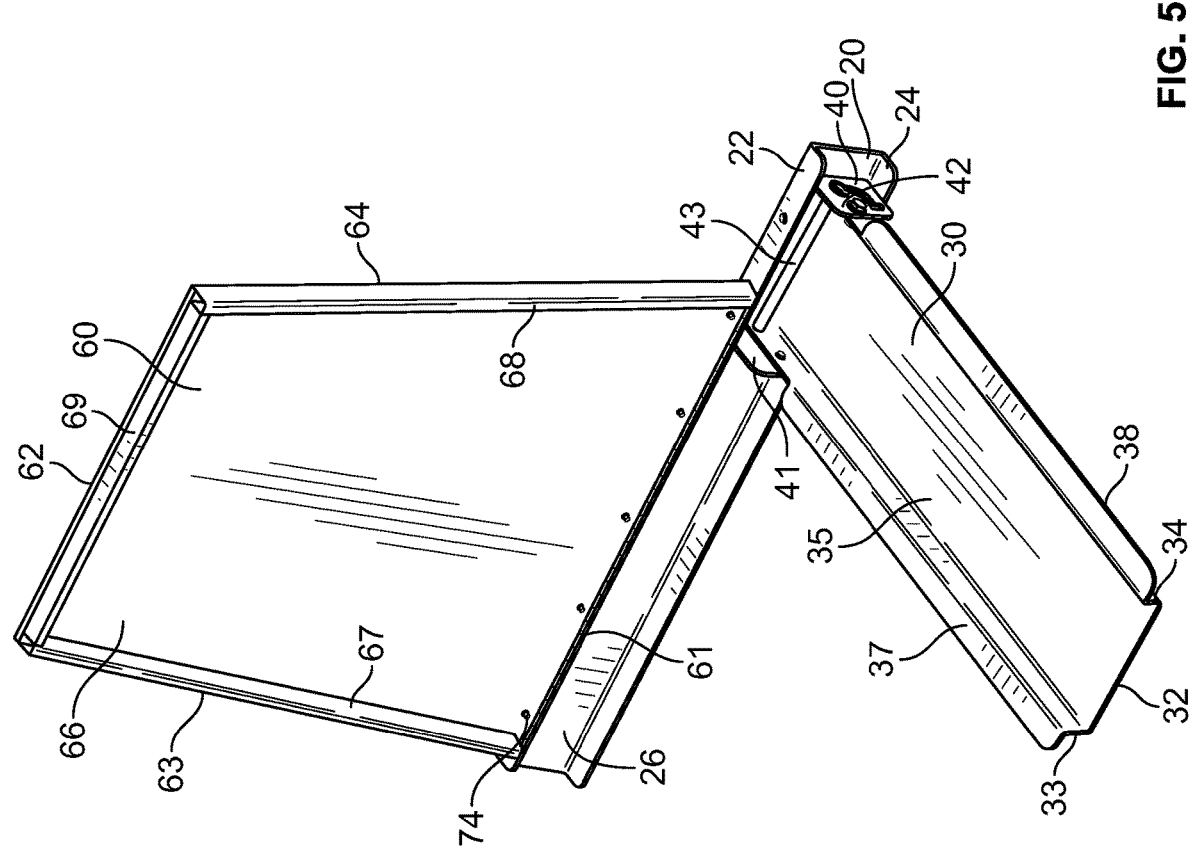
FIG. 5 is a perspective view of a launder cover being raised and a support member being lowered of a launder cover system in accordance with an example embodiment.

The mount 20 may comprise various shapes, sizes, and configurations. In the exemplary embodiment shown in the figures, the mount 20 is comprised of a bracket structure which extends around the inner perimeter of the tank 12. As best shown in FIG. 5, an exemplary mount 20 may comprise a bracket-like structure which includes an upper member 22, a lower member 24, and a channel 26 defined between the upper and lower members 22, 24. The upper member 22 and lower member 24 are generally horizontally-oriented and parallel with each other.

The mount 20 may be connected to the tank wall 13 of the tank 12 by one or more fasteners. In other embodiments, the mount 20 may be connected to the tank 12 by various other methods, such as by the use of welding, adhesives, or the like. The mount 20 may in some embodiments be integrally formed with the tank wall 13.

While the figures illustrate that the mount 20 extends for the entire perimeter of the tank wall 13, it should be appreciated that, in some embodiments, the mount 20 may only cover part of the perimeter of the tank wall 13. In other embodiments, there may be multiple mounts 20 utilized so as to create a gap between launder covers 60 if desired.

C. Support Members

As shown throughout the figures, the launder cover system 10 may include a plurality of support members 30, with each of the support members 30 being hingedly or pivotably connected to the tank wall 13. In the exemplary embodiment shown in the figures, the each of the support members 30 is hingedly or pivotably connected to the mount 20 which runs along the inner perimeter of the tank wall 13 such as shown in FIGS. 1-4.

Figure 6:
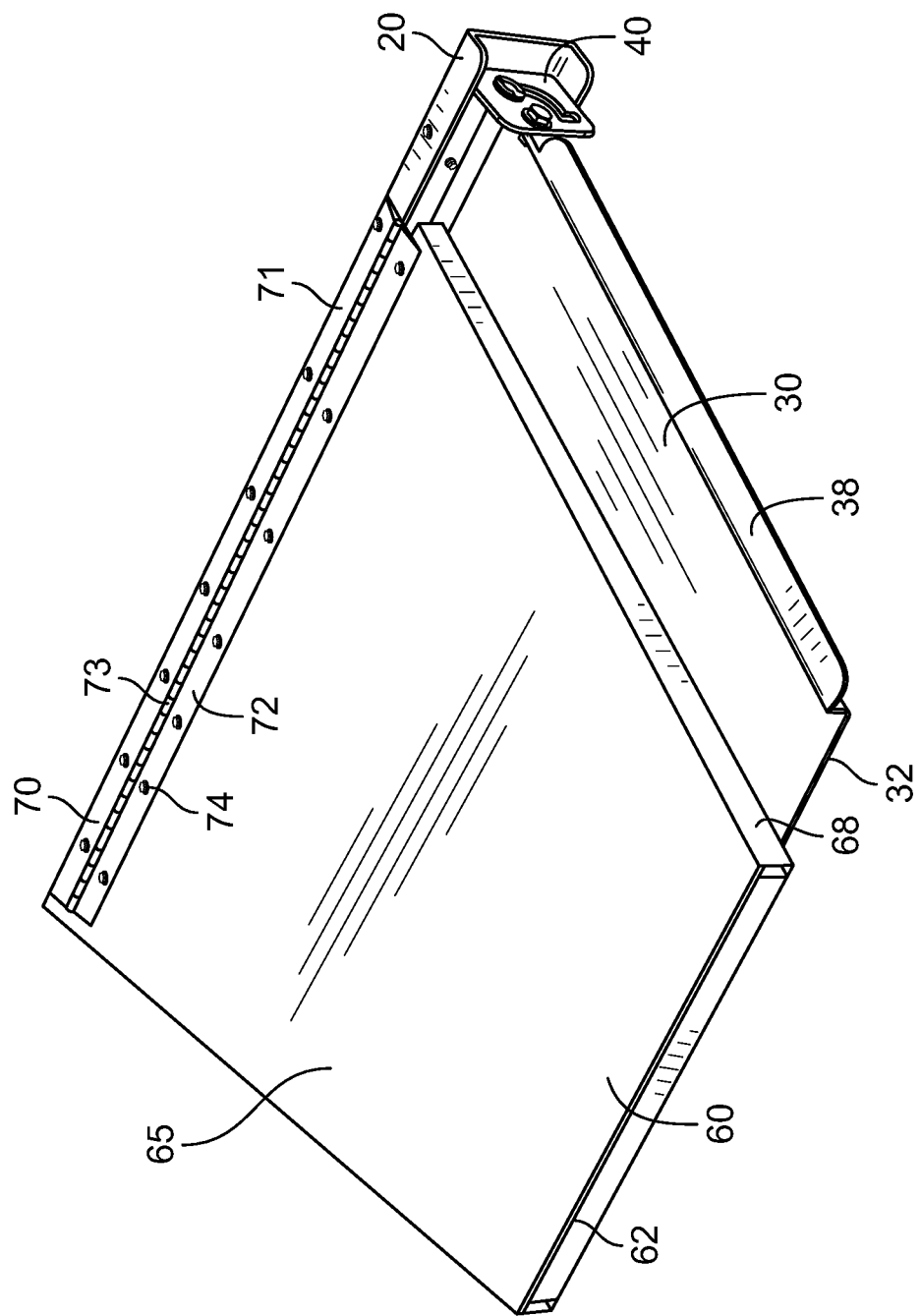
FIG. 6 is a perspective view of a launder cover system with both a support member and launder cover in the lowered position in accordance with an example embodiment.

FIGS. 5-7 illustrate an exemplary embodiment of a support member 30 for use with the launder cover system 10. Each of the support members 30 is adjustable between a first position and a second position. In the first position, the support members 30 are lowered to be horizontal or substantially horizontal so as to provide support for a pair of adjacent launder covers 60 as discussed herein. In the second position, the support members 30 are upright (vertical or substantially vertical) such as shown in FIG. 7.

As shown, each of the support members 30 will generally comprise a first end 31, a second end 32, a first side 33, a second side 34, an upper end 35, and a lower end 36. The first end 31 of the support member 30, comprising its inner end, is hingedly or pivotably connected to the tank wall 13, such as by being connected to the mount 20. The second end 32 of the support member 30 is generally supported when the support member 30 by a launder support 80 as discussed herein. However, in some embodiments, the support member 30 may instead comprise a cantilevered configuration in which the second end 32 of the support member 30 is not so supported, with the support member 30 instead being supported solely by the support rod 52 or support brackets 54 when in its lowered position.

The shape, size, and structure of each of the support members 30 may vary in different embodiments. In the exemplary embodiment shown in the figures, each of the support members 30 comprises a substantially rectangular shape or configuration where the length of the support members 30 (distance from first end 31 to second end 32) is greater than the width of the support members 30 (distance from first side 33 to second side 34).

As shown in FIGS. 5-7, each support member 30 may include a pair of flanges 37, 38 which aid in securing the adjacent launder covers 60 in the raised or lowered position as discussed in more detail below. In the exemplary embodiment shown in the figures, the first side 33 of the support member 30 comprises a first flange 37 and the second side 34 of the support member 30 comprises a second flange 38.

As shown in FIG. 5, the first flange 37 may extend outwardly from the first side 33 of the support member 30 and the second flange 38 may extend outwardly from the second side 34 of the support member 30. While the figures illustrate that the flanges 37, 38 extend at a right angle with respect to the respective sides 33, 34 of the support member 30, it should be appreciated that, in some embodiments, the flanges 37, 38 may extend at different angles than shown in the exemplary figures.

When an adjacent launder cover 60 has been adjusted into the lowered position such as shown in FIG. 6, the launder cover 60 will rest upon the upper end 35 of the support member 30. When both the support member 30 and the launder cover 60 are in the raised position or in the lowered position, the respective flanges 67, 68 of the launder cover may engage with the respective flanges 37, 38 of the support member 30 to restrict lateral movement of the launder cover 60 when so engaged.

As shown in FIG. 7, each of the support members 30 is positioned between a pair of launder covers 60. The support members 30 function to retain the launder covers 60 in their raised or lowered positions. When the support member 30 is in its lowered position, adjacent launder covers 60 may similarly be lowered so as to rest upon the support member 30 such as shown in FIG. 6. When the launder covers 60 are in the raised position, the support member 30 may be similarly raised to secure the launder covers 60 in the raised position. As shown throughout the figures, the launder covers 60 may be independently adjustable with respect to the support members 30.

The support members 30 may be pivotably or hingedly connected to the tank wall 13 in various manners. In the exemplary embodiment shown in FIGS. 8A and 8B, each of the support members 30 may comprise a pivot connector 40 about which the support members 30 may pivot. The pivot connector 40 may be connected to the mount 20 such as shown in the figures, such as by the use of fasteners. In other embodiments, the pivot connector 40 may be connected directly to the tank wall 13.

The shape, size, and configuration of the pivot connectors 40 of the launder cover system 10 may vary in different embodiments. In the exemplary embodiment shown in the figures, each pivot connector 40 comprises a bracket-like structure including a first member 41 and a second member 42, with the first and second members 41, 42 each extending inwardly from the tank wall 13 at a right angle. The support member 30 is hingedly or pivotably connected to the pivot connector 40 such that the support member 30 may pivot with respect to the pivot connector 40.

Figure 8A:
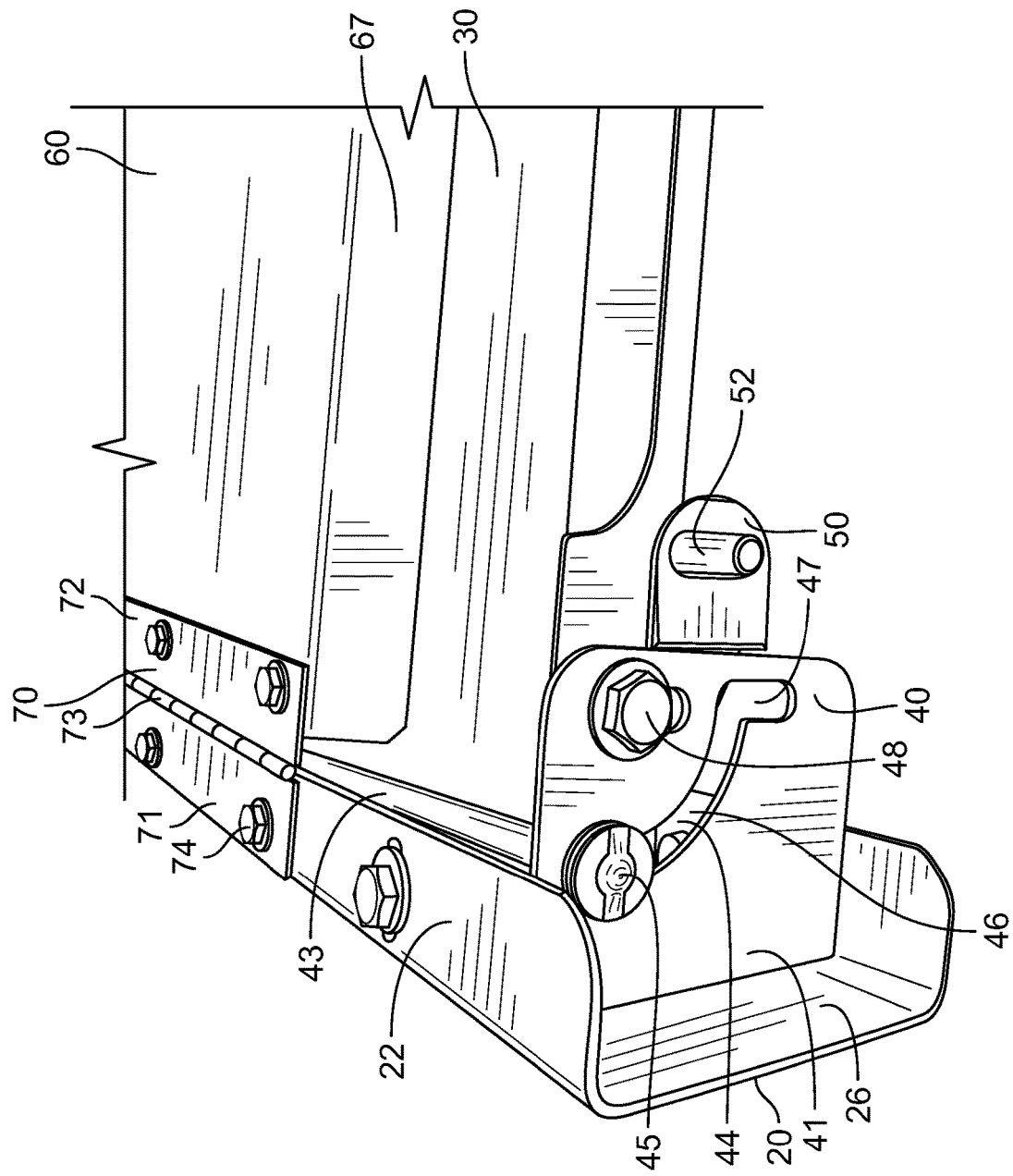
FIG. 8A is a perspective view of a launder cover system with a support member in a lowered position by a support rod in accordance with an example embodiment.
Figure 8B:
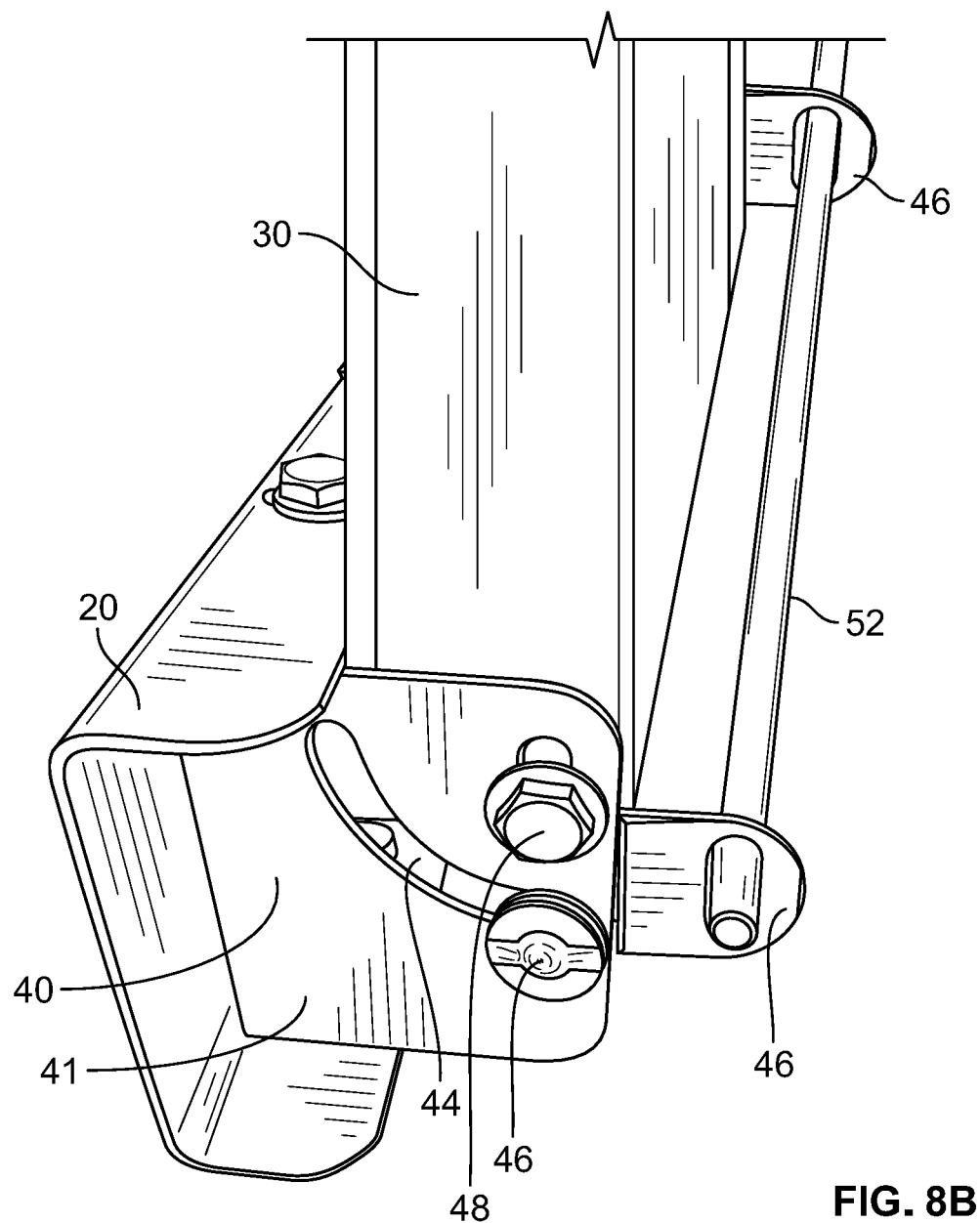
FIG. 8B is a perspective view of a launder cover system with a support member secured in a raised position in accordance with an example embodiment.

As shown in FIGS. 8A and 8B, the pivot connector 40 may comprise a linkage 43 which extends through the flanges 37, 38 of the support member 30. The respective ends of the linkage 43 may include a fastener 45 such as a nut or the like. In some embodiments, the fasteners 45 may be tightened or loosened to adjust resistance to pivoting of the support member 30.

Continuing to reference FIGS. 8A and 8B, it can be seen that both the first member 41 and the second member 42 of the pivot connector 40 includes a key slot 44. The key slot 44 serves to guide the linkage 43 and fasteners 45 along an arc-path to pivot the support member 30. In the exemplary embodiment shown in the figures, the key slot 44 may comprise an arc portion 46 and a vertical portion 47. The arc portion 46 guides the support member 30 along an arc as it is pivoted between its positions.

The vertical portion 47 serves as a locking mechanism to selectively lock the support member 30 in its raised position such as shown in FIG. 8B. As the support member 30 is adjusted upwardly, the fasteners 45 and linkage 43 will follow the key slot 44 downwardly along the arc portion 46. Upon reaching the bottom of the arc portion 46, the linkage 43 and fasteners 45 will engage within the vertical portion 47 by force of gravity, where they will be locked in place. To release, the user need only pull the support member 30 upwardly so as to disengage the fasteners 45 and linkage 43 from the vertical portion 47, after which they may follow along the arc portion 46 to return to the lowered position.

As shown in FIGS. 8A and 8B, the pivot connector 40 may comprise a pair of pivots 48 which are connected between the pivot connector 40 and the support member 30. More specifically, a first pivot 48 may be connected between the first side 33 of the support member 30 and the first member 41 of the pivot connector 40 and a second pivot 49 may be connected between the second side 34 of the support member 30 and the second member 42 of the pivot connector 40. The pivots 48 may comprise pins, fasteners, or the like which allow the support member 30 to pivot with respect to the pivot connector 40.

The manner in which the support members 30 are supported in their lowered positions may vary in different embodiments. FIGS. 8A and 8B illustrate a first embodiment in which brackets 50 extend outwardly from the pivot connector 40. As shown, the first member 41 of the pivot connector 40 may include a first bracket 50 and the second member 42 of the pivot connector 40 may include a second bracket 50, with each of the brackets 50 extending outwardly from the pivot connector 40 towards the center of the tank 12.

Continuing to reference FIGS. 8A and 8B, a support rod 52 is shown extending between the respective brackets 50 of a pivot connector 40. The support rod 52 may comprise an elongated member on which the support member 30 may rest when in the lowered position. The support rod 52 will thus generally be longer than the width of the support member 30 such that the support member 30 may rest fully upon the support rod 52 when lowered. FIG. 8A illustrates a support member 30 resting upon the support rod 52 in its lowered position. FIG. 8B illustrates the support member 30 having been raised into its raised position.

Figure 9A:
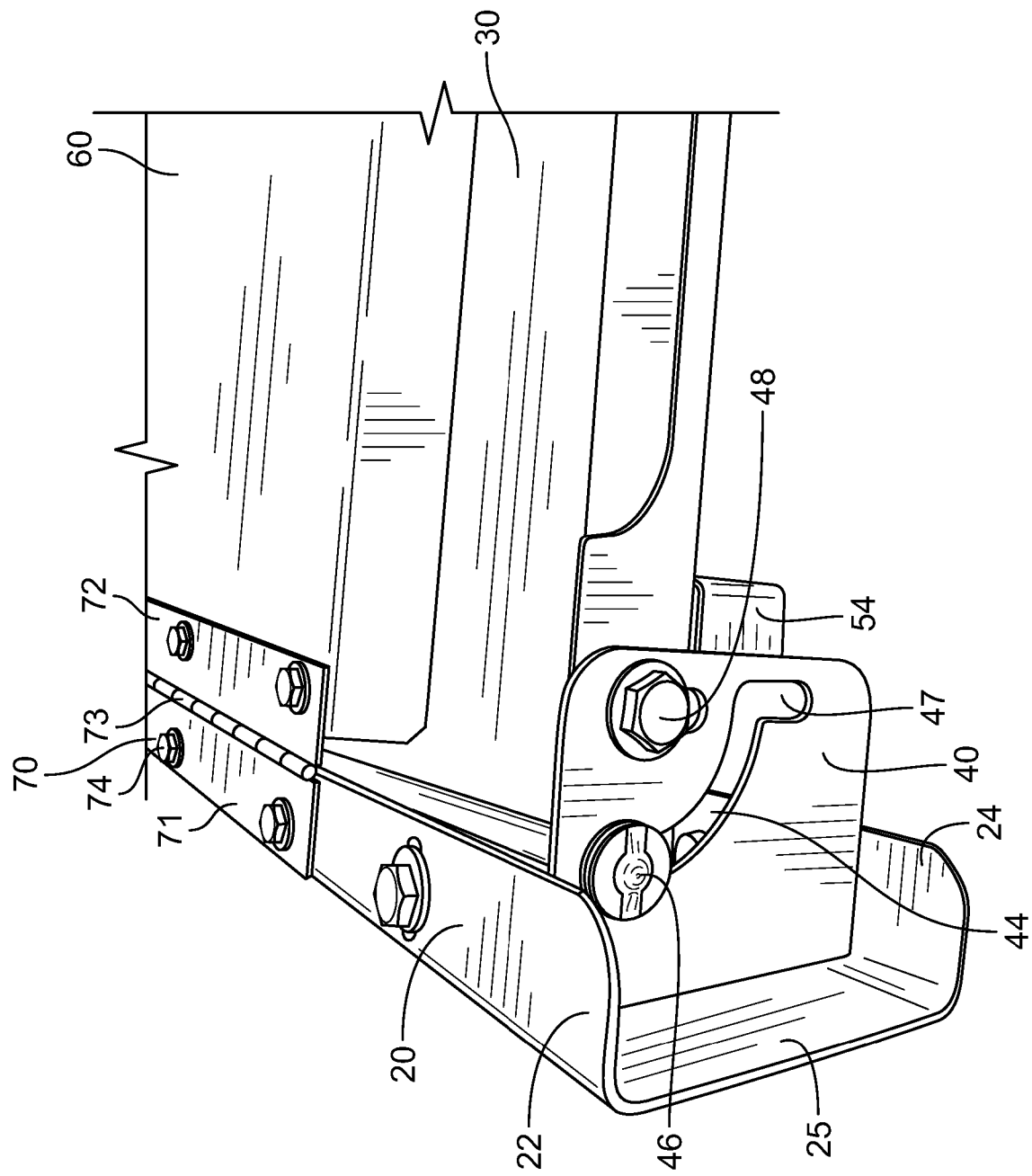
FIG. 9A is a perspective view of a launder cover system with a support member in a lowered position by a pair of support brackets in accordance with an example embodiment.
Figure 9B:
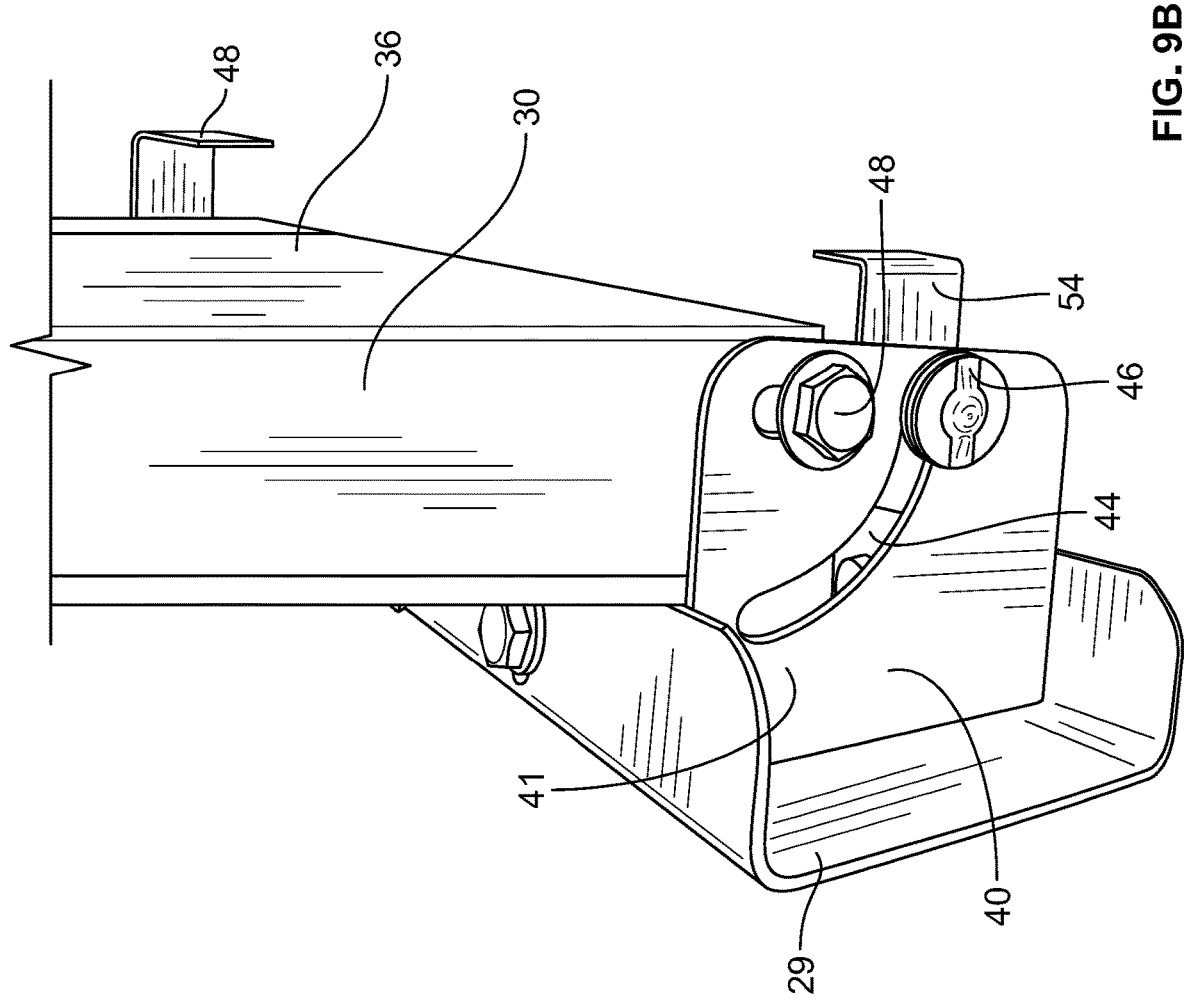
FIG. 9B is a perspective view of a launder cover system with a support member secured in a raised position in accordance with an example embodiment.

FIGS. 9A and 9B illustrate a second embodiment in which a pair of distinct support brackets 54 is instead utilized to support the support member 30 in its lowered position. As shown, the first member 41 of the pivot connector 40 may comprise a first support bracket 54 and the second member 42 of the pivot connector 40 may comprise a second support bracket 54. Each of the support brackets 54 may comprise a curved piece of metal or the like which first extends outwardly from the pivot connector 40 before curving at a right angle. FIG. 9A illustrates a support member 30 resting upon a pair of support brackets 54. FIG. 9B illustrates the support member 30 having been raised into its raised position.

As shown in FIGS. 11 and 12, the second end 32 of the support member 30 may rest upon a launder support 80 when in the lowered position. Each launder support 80 provides additional stability and support for each launder cover 60 and support member 30. It should be appreciated that multiple support members 30 may be supported by a single launder support 80 or each support member 30 may include its own individual launder support 80.

D. Launder Covers

As shown throughout the figures, the launder cover system 10 includes a plurality of launder covers 60 which may be adjusted between a raised position, in which the launder channel 15 is exposed, and a lowered position, in which the launder channel 15 is covered. When so covered, the launder covers 60 will reduce sunlight exposure which can encourage algae growth within the launder channel 15. When raised, the launder channel 15 is exposed so that it may be serviced as needed.

Exemplary embodiments of launder covers 60 are best shown in FIGS. 5-7. As shown, the launder covers 60 may each comprise a first end 61, a second end 62, a first side 63, a second side 64, an upper end 65, and a lower end 66. The shape, size, and configuration of the launder covers 60 may vary in different embodiments. Thus, the exemplary launder covers 60 shown in the figures should not be construed as limiting in scope. Various materials may be utilized for the launder covers 60 including stainless steel.

As shown in FIG. 5, the first end 61 of each launder cover 60 may be pivotably connected to the tank wall 13, such as by connecting to a mount 20 on the tank wall 13. The manner in which each launder cover 60 is pivotably connected to the tank wall 13 may vary in different embodiments. In the exemplary embodiment shown in the figures, each launder cover 60 is pivotably connected to a mount 20 which is itself connected to or integrated with the tank wall 13.

With reference to FIGS. 5-7, it can be seen that a hinge connector 70 is connected between each launder cover 60 and the mount 20 on the tank wall 13 of the tank 12. Various types of hinge connectors 70 may be utilized, and thus the exemplary embodiment of a hinge connector 70 shown in FIG. 6 should not be construed as limiting.

In the exemplary embodiment shown in the figures, the hinge connector 70 comprises a first member 71, a second member 72, and a hinge 73 connected between the first and second members 71, 72 such that the second member 72 may pivot with respect to the first member 71. The first member 71 of the hinge connector 70 is connected to the upper member 22 of the mount 20, such as by fasteners 74.

The second member 72 of the hinge connector 70 is connected to the upper end 65 of the launder cover 60, such as by fasteners 74. A hinge 73 is connected between the first and second members 71, 72. In this manner, the second member 72 of the hinge connector 70 and attached launder cover 60 may pivot with respect to the first member 71 of the hinge connector 70 and the mount 20.

With reference to FIGS. 5-7, it can be seen that the launder covers 60 may each comprise a trapezoidal shape, with the width of the launder covers 60 tapering inwardly from the first end 61 of the launder cover 60 to the second end 62 of the launder cover 60. Such tapering may be utilized for the launder covers 60 not only to accommodate circular tanks 12, but also to ensure that the launder covers 60 overlap the underlying support members 30. In other embodiments, the launder covers 60 may each be rectangular. The shape, size, and configuration of the launder covers 60 may vary depending on the size and type of clarifier tank being covered, and thus the exemplary embodiment shown in the figures should not be construed as limiting in scope.

As shown in FIGS. 5-7, the launder covers 60 may each comprise a pair of flanges 67, 68 which engage with corresponding flanges 37, 38 on the support member 30 to prevent lateral movement of the launder covers 60. When the support member 30 between a pair of launder covers 60 is lowered, the launder covers 60 may lowered to rest upon the support member 30 with two adjacent launder covers 60 being supported by a single central support member 30. When in the lowered or raised position, the first flange 67 of the launder cover 60 may engage with or contact the first flange 37 of the support member 30 and the second flange 68 of the launder cover 60 may engage with or contact the second flange 38 of the support member 30 to prevent lateral movement.

As shown in the figures, the launder cover 60 may comprise an end flange 69 which extends downwardly from the second end 62 of the launder cover 60. The end flange 69 may extend between the first and second sides 63, 64 of the launder cover 60 along the lower end 66 of its lower end 66 as shown in the figures.

As shown in FIGS. 11 and 12, the second end 62 of the launder cover 60 may rest upon a launder support 80 when in the lowered position. Each launder support 80 provides additional stability and support for each launder cover 60 (in addition to the support member 30). It should be appreciated that multiple launder covers 60 may be supported by a single launder support 80 or each launder cover 60 may include its own individual launder support 80.

E. Launder Supports

Figure 10:
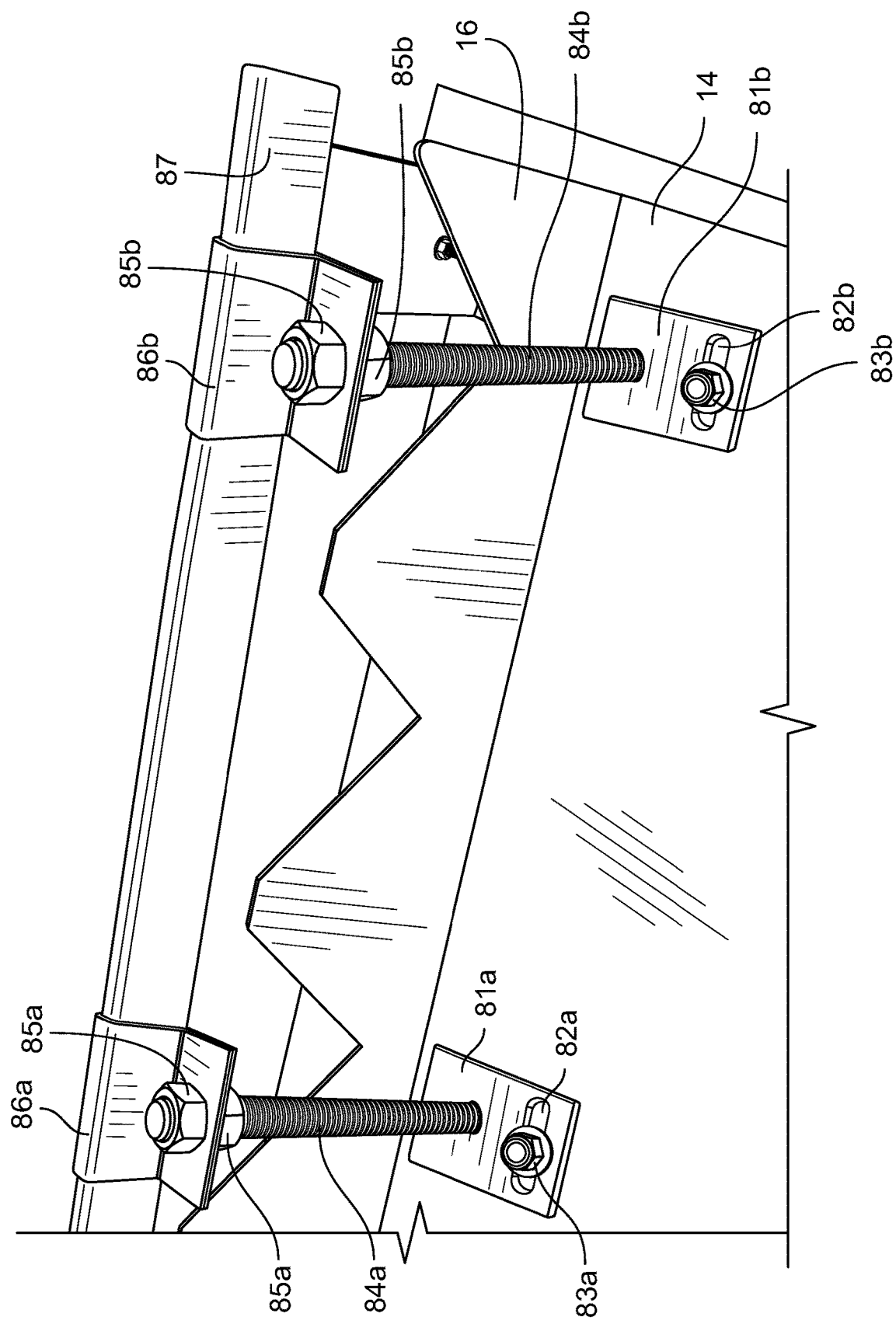
FIG. 10 is a perspective view of a launder support of a launder cover system in accordance with an example embodiment.

As best shown in FIGS. 10-12, the launder cover system 10 may include a plurality of launder supports 80 which are each adapted to support the second end 62 of a launder cover 60. The launder supports 80 may be height-adjustable so that the lowered position of the launder cover 60 may be adjusted. This is useful to accommodate for different baffle levels. For example, if on a particular day the baffles are lower than usual, the launder supports 80 may be lowered such that the second end of the launder supports 80 are lowered to just above the baffles so as to minimize sunlight penetrating between the launder covers 60 and the baffles.

FIGS. 10-12 illustrate an exemplary embodiment of a launder support 80. As shown, each launder support 80 may be mounted or connected to the channel wall 14 (weir wall) which is distally-spaced with respect to the tank wall 13 so as to define a launder channel 15 (effluent launder). The channel wall 14 may include a weir 16 such as shown in the figures. The weir 16 may be connected to the channel wall 14, such as by brackets, fasteners, or the like. A separate baffle (not shown) may be positioned outwardly from the weir 16 (i.e., between the weir 16 and the center of the tank 12) as is common with clarifier tanks 12 such that water flows underneath the baffle and then over the weir 16 to enter the launder channel 15. Such a configuration prevents floating scum from entering the launder channel 15.

With reference to FIG. 10, it can be seen that each launder support 80 may comprise a pair of mounts 81a, 81b, with a first mount 81a being connected to a first side of the top of the channel wall 14 and the second mount 81b being connected to a second side of the top of the channel wall 14 such that the first and second mounts 81a, 81b are distally-spaced with respect to each other. Each of the mounts 81a, 81b may include a slot 82 through which a fastener 83 may be inserted to secure the mounts 81a, 81b to the channel wall 14. The slots 82 allow for lateral adjustment of the positioning of the mounts 81a, 81b as needed.

Continuing to reference FIG. 10, it can be seen that each of the mounts 81a, 81b includes a threaded connector 84a, 84b extending upwardly therefrom. As shown, the first mount 81a may comprise a first threaded connector 84a extended upwardly and the second mount 81b may comprise a second threaded connector 84b extended upwardly. The threaded connectors 84a, 84b may each comprise elongated members such as rods, fasteners, or the like with external threading.

A rail 87 is connected between the threaded connectors 84a, 84b, with the rail 87 providing support for the launder covers 60 when in the lowered position, with the launder covers 60 resting upon the rail 87 when lowered. The rail 87 will generally extend laterally between the pair of threaded connectors 84a, 84b along the channel wall 14.

The effective height of the rail 87 may be adjusted to accommodate different baffle heights or other considerations. The rail 87 may be adjusted to the height of the baffle in some embodiments, with minimum clearance to the baffle along with some overhang and pitch to provide maximum shade. Baffles will often move somewhat depending on various conditions. In order to maintain a snug overhang of the launder covers 60 over the baffles, the height of the launder support 80 may be adjusted as-needed based on movement and positioning of the baffles.

The rail 87 may be connected to the threaded connectors 84a, 84b by a bracket 86a, 86b, with the first threaded connector 84a being connected to a first side of the rail 87 by a first bracket 86a and the second threaded connector 84b being connected to a second side of the rail 87 by a second bracket 86b. The brackets 86a, 86b may be connected to the rail 87 in various manners, such as by inserted the rail 87 through the brackets 86a, 86b.

Continuing to reference FIG. 10, it can be seen that each of the brackets 86a, 86b includes an adjustment member 85a, 85b which are threadably connected to the threaded connectors 84a, 84b. In the exemplary embodiment shown in the figures, first adjustment members 85a are used to connect the first threaded connector 84a to the first bracket 86a and second adjustment members 85b are used to connect the second threaded connector 84b to the second bracket 86b.

The adjustment members 85*a*, 85*b* may comprise nuts or the like which may be threaded adjusted up and down the threaded connectors 84*a*, 84*b*. In this manner, the height of the brackets 86*a*, 86*b*, and thus the height of the connected rail 87, may be adjusted upwardly or downwardly depending on the level of the baffles of the clarifier tank 12.

F. Operation of Preferred Embodiment

In use, the launder covers 60 and support members 30 are each independently pivotably connected to the inner perimeter of the tank wall 13 of a tank 12. The launder covers 60 and support members 30 may be installed without completely draining the tank 12. Instead, water level of the tank 12 can be lowered slightly to allow for installation. Further, because the support members 30 provide structural support for the launder covers 60, the launder covers 60 may comprise lighter materials than is typically needed in prior systems in which support members 30 are not used.

Each of the launder covers 60 may independently pivot with respect to the tank wall 13 and each of the support members 30 may independently pivot with respect to the tank wall 13. As shown in FIGS. 1-4, a mount 20 may be connected to the tank wall 13, with the mount 20 encircling the tank wall 13. The mount 20 may include an upper member 22 comprised of a first flange and a lower member 24 comprised of a second flange, with a channel 26 being defined between the upper member 22 and the lower member 24.

A hinge connector 70 is connected to mount 20, with the first member 71 of the hinge connector 70 being connected to the upper member 22 of the mount 20, such as by fasteners 74. The second member 72 of the hinge connector 70 is connected to a launder cover 60 so as to pivotably connect the launder cover 60 to the tank wall 13. In the exemplary embodiment shown in the figures, the second member 72 of the hinge connector 70 is connected to the upper end 35 of the support member 30 adjacent to its first end 31, such as by fasteners 74. In this manner, each support member 30 is pivotably or hingedly connected to the tank wall 12.

The support members 30 are each pivotably or hingedly connected to the tank wall 13 by a pivot connector 40 which is separate and distinct from the hinge connector 70 used to pivotably connect each of the support members 30. The pivot connector 40 also serves the function of aligning the support members 30 around the tank wall 12 at the same level and orientation, as well as providing the requisite support for the support members 30 when in their lowered positions.

By using both a hinge connector 70 for each launder cover 60 and a pivot connector 40 for each support member 30, the support members 30 and the launder covers 60 may each be independently pivotable with respect to the tank wall 13. Thus, a user may serve portions of the tank 12 without lifting all of the support members 30 and/or launder covers 60.

The pivot connector 40 includes first and second members 41, 42 which are connected to the mount 20 or, in some embodiments, directly to the tank wall 13. The first and second members 41, 42 may be positioned between the upper and lower members 22, 24 of the mount such as shown in FIG. 5. The pivot connector 40 may include an upper lip which is connected to the upper member 22 of the mount 20, such as via fasteners 74 as shown in FIG. 8A.

The pivot connector 40 includes a guide slot 44 in which a linkage 43 may slide so as to guide movement of the support member 30. The guide slot 44 includes an arc portion 46, which guides movement of the linkage 43 and thus the support member 30, and a vertical portion 47 which serves to lock the linkage 43 therein so as to lock the support member 30 in its raised position such as shown in FIG. 8B.

The launder supports 80 are connected to the channel wall 14 (weir wall) of the launder channel 15 (effluent launder). Mounts 81*a*, 81*b* are secured to the upper end of the channel wall 14 such as shown in FIG. 10. Each of the mounts 81*a*, 81*b* includes a slot 82 and fastener 83 which may be utilized to adjust the mounts 81*a*, 81*b* laterally as needed during or after installation.

Each of the mounts 81*a*, 81*b* includes a threaded connector 84*a*, 84*b* which extends upwardly from its corresponding mount 81*a*, 81*b*. A bracket 86*a*, 86*b* is connected to the upper end of each of the threaded connectors 84*a*, 84*b* by adjustment members 85*a*, 85*b* such as nuts or the like. The adjustment members 85*a*, 85*b* are threadably connected to the threaded connectors 84*a*, 84*b* such that each of the adjustment members 85*a*, 85*b* may be adjusted upwardly or downwardly along the length of each of the threaded connectors 84*a*, 84*b*.

A rail 87 is connected between the brackets 86*a*, 86*b* of each of the launder supports 80. The rail 87 is shown as comprising a rectangular cross-section so as to fit within the brackets 86*a*, 86*b* without rotating therein, but may comprise other cross-sections in different embodiments, including a square-shaped cross section or a circular-shaped cross section. In any case, the support rod 52 is connected between a respective pair of brackets 86*a*, 86*b* so as to extend horizontally between the pair of brackets 86*a*, 86*b*.

With the support members 30 pivotably connected to the tank wall 12 by the pivot connectors 40, the launder covers 60 pivotably connected to the tank wall 12 by the hinge connector 70, and the launder supports 80 being connected to the channel wall 14 opposite the tank wall 13, the launder cover system 10 is ready for use.

The launder supports 80 may be adjusted based on the level of the baffle. The rail of the launder supports 80 may be raised or lowered using the adjustment members 85*a*, 85*b*, which may be adjusted up or down the threaded connectors 84*a*, 84*b* so as to raise or lower the rail 87 between the brackets 86*a*, 86*b*. The rail 87 may thus be lowered or raised so as to ensure that, when a launder cover 60 is resting thereupon, there is a tight fit between the launder cover 60 and the baffles to prevent sunlight incursion. The rail 87 may also be laterally adjusted along the channel wall 14 using the fastener 83 and slot 82 of the mounts 81*a*, 81*b*.

With the launder support 80 configured for the baffle, the launder covers 60 may be lowered into their covered positions. In order to do so, the support member 30 between each pair of launder covers 60 is first lowered into its lowered position. The adjacent launder covers 60 may then be lowered into their covered positions. Each launder cover 60 will be supported by adjacent support members 30, with a first support member 30 supporting a first side 33 of the launder cover 60 and a second support member 30 supporting a second side 34 of the launder cover 60.

The support members 30 are secured in the lowered position by the support rod 52 or support brackets 54 as described previously. The launder covers 60 are secured in the lowered position both by the support members 30 and the launder support 80, with the second end 62 of each launder cover 60 resting upon the rail 87 of a launder support 80.

The launder covers 60 may be selectively lowered as needed. In most cases, all of the launder covers 60 will be lowered so as to cover the entire length of the launder channel 15 and thus prevent or limit sunlight exposure which may encourage algae growth. When so lowered, the rotating arm of the clarifier tank 12 may pass underneath the launder covers 60. However, all launder covers 60 need not be lowered at all times. For example, if a portion of the tank 12 is protected from sunlight by shade during parts of the day, the launder covers 60 in that portion of the tank 12 may be kept raised so as to expose the underlying launder channel 15 while sunlight is blocked.

In some cases, it may be desirable or necessary to expose portions of the launder channel 15, such as for maintenance, service, or cleaning. One or more of the launder covers 60 may be individually raised as needed, with the remaining launder covers 60 remaining in the lowered position so as to cover the portions of the launder channel 15 that are not being maintained, serviced, or cleaned.

Figure 2:
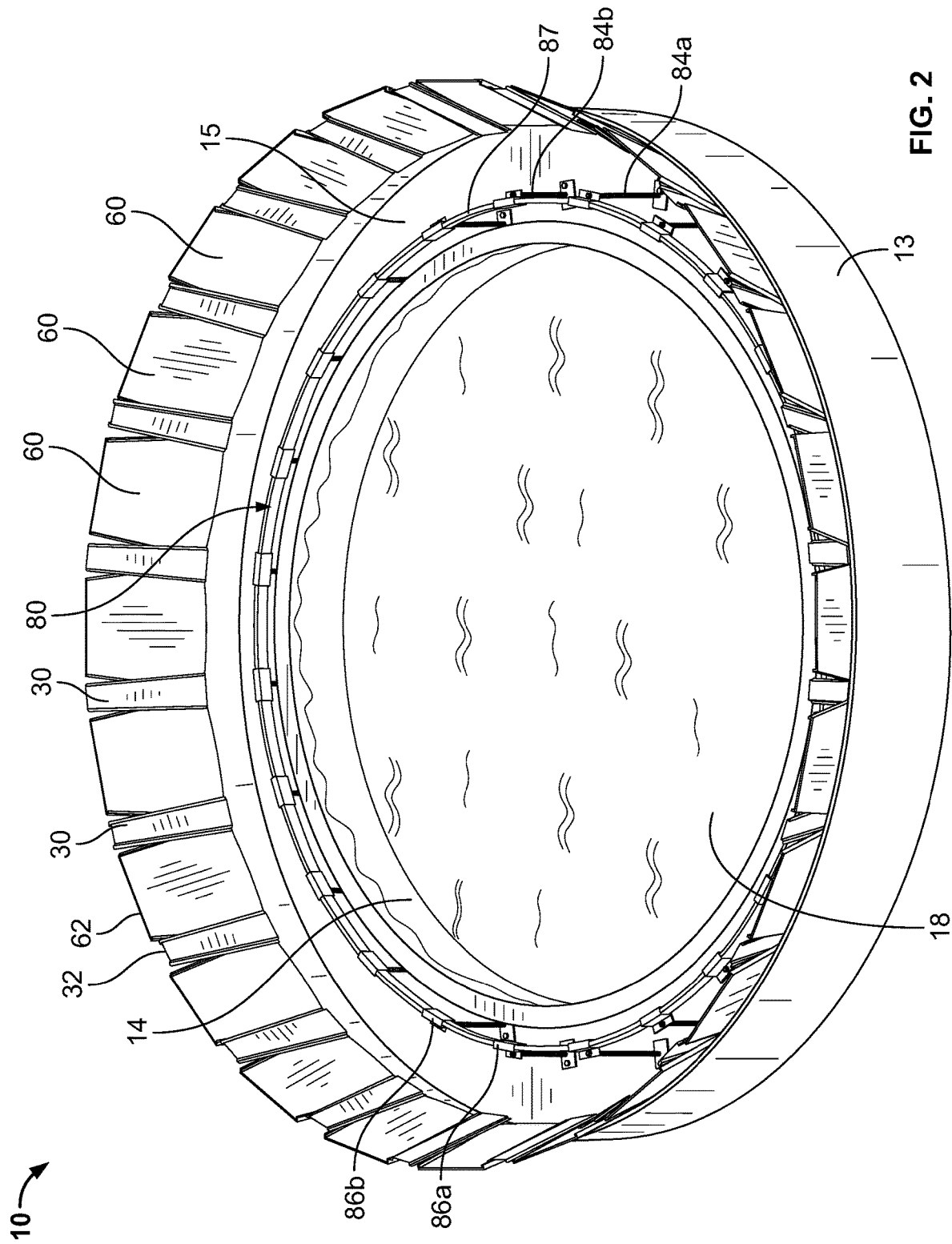
FIG. 2 is a perspective view of a launder cover system with all support members and launder covers being raised in accordance with an example embodiment.

FIG. 1 illustrates all of the launder covers 60 and support members 30 in the lowered position so as to cover the launder channel 15 and prevent sunlight incursion. FIG. 2 illustrates all of the launder covers 60 being raised, with each of the support members 30 securing a pair of adjacent launder covers 60 upright when the linkage 43 of the pivot connectors 40 engages within the locking portion 47 of the slots 44.

Figure 3:
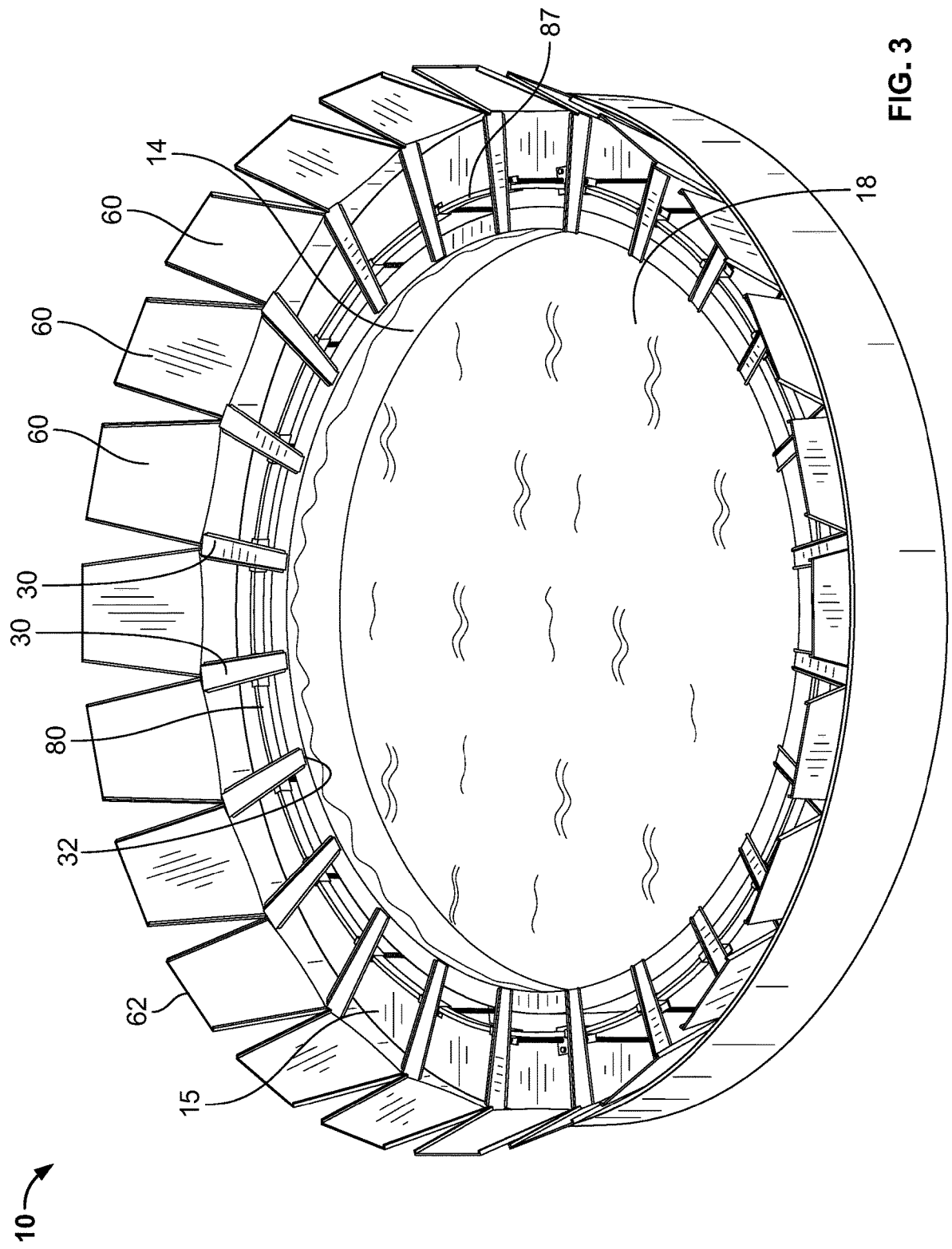
FIG. 3 is a perspective view of a launder cover system with all launder covers being raised and all support members being lowered in accordance with an example embodiment.
Figure 4:
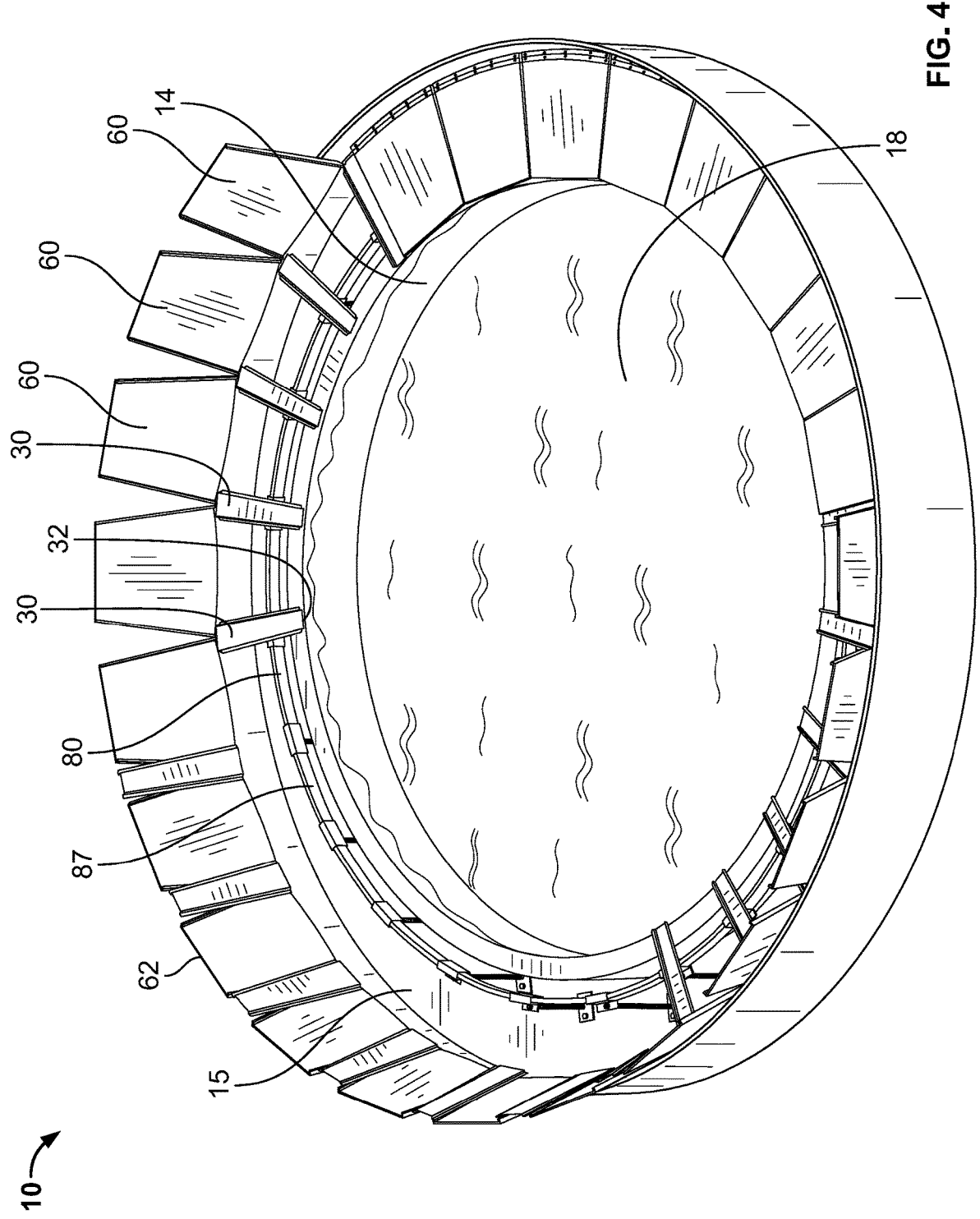
FIG. 4 is a perspective view of a launder cover system with a combination of raised and lowered support members and launder covers in accordance with an example embodiment.

FIG. 3 illustrates the support members 30 all being lowered, with the launder covers 60 each remaining in the raised position. However, in this position, the launder covers 60 are not locked or secured in the raised position and thus may be freely lowered as needed. FIG. 4 illustrates various positions of the support members 30 and launder covers 60, with some support members 30 being raised, some support members 30 being lowered, some launder covers 60 being raised, and some launder covers 60 being lowered. This illustrates the versatility of the launder cover system 10, which allows individual portions of the launder channel 15 to be selectively exposed as needed without exposing the remaining portions of the launder channel 15.

Unless otherwise defined, all technical and scientific terms used herein have the same meaning as commonly understood by one of ordinary skill in the art to which this invention belongs. Although methods and materials similar to or equivalent to those described herein can be used in the practice or testing of the launder cover system, suitable methods and materials are described above. All publications, patent applications, patents, and other references mentioned herein are incorporated by reference in their entirety to the extent allowed by applicable law and regulations. The launder cover system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A launder cover system, comprising:
   a support member adapted to be pivotably connected to a tank wall of a tank, wherein the support member is adjustable between a second position and a first position;
   a launder cover adapted to be pivotably connected to the tank wall, wherein at least a portion of the support member is positioned underneath the launder cover, wherein the launder cover and the support member are each independently pivotable with respect to the tank wall;
   a hinge connector connected to the launder cover, wherein the hinge connector is adapted to be connected to the tank wall of the tank; and
   a pivot connector connected to the support member, wherein the pivot connector is adapted to be connected to the tank wall of the tank;
   wherein the launder cover is adjustable between a lowered position and a raised position, wherein in the lowered position the launder cover is adapted to cover a launder channel of the tank, and wherein in the raised position the launder cover is adapted to expose the launder channel of the tank;
   wherein the support member is adapted to support the launder cover in the raised position when the support member is in the second position.

2. The launder cover system of claim 1, wherein the tank wall comprises a mount, wherein the hinge connector is connected to the mount.

3. The launder cover system of claim 2, wherein the hinge connector comprises a first member, a second member, and a hinge between the first member and the second member, wherein the first member is connected to the mount and wherein the second member is connected to the launder cover.

4. The launder cover system of claim 1, wherein the tank wall comprises a mount, wherein the pivot connector is connected to the mount.

5. The launder cover system of claim 1, wherein the pivot connector comprises a support rod for supporting the support member in the first position.

6. The launder cover system of claim 1, wherein the pivot connector comprises a pair of support brackets for supporting the support member in the first position.

7. The launder cover system of claim 1, wherein the pivot connector comprises a linkage movably connected within a slot so as to guide movement of the support member.

8. The launder cover system of claim 7, wherein the slot comprises an arc portion and a vertical portion, wherein the arc portion is adapted to guide movement of the support member, wherein the vertical portion is adapted to lock the support member in the second position.

9. The launder cover system of claim 1, further comprising a launder support connected to a channel wall of the launder channel, wherein the launder cover is adapted to rest upon the launder support when the launder cover is in the lowered position.

10. The launder cover system of claim 9, wherein the launder support comprises a rail.

11. The launder cover system of claim 10, wherein the rail is adapted to be raised or lowered.

12. The launder cover system of claim 11, wherein the rail comprises a pair of threaded connectors for raising or lowering the rail.

13. A launder cover system, comprising:
    a mount adapted to be connected to a tank wall of a tank;
    a first launder cover pivotably connected to the mount, wherein the first launder cover is adjustable between a lowered position and a raised position, wherein in the lowered position the first launder cover is adapted to cover a launder channel of the tank, wherein in the raised position the first launder cover is adapted to expose the launder channel of the tank, wherein the first launder cover comprises a first side and a second side;
    a first support member pivotably connected to the mount, wherein at least a portion of the first support member is positioned underneath the first side of the first launder cover, wherein the first support member is adjustable between a second position and a first position; and a hinge connector connected to the first launder cover and the mount; and a pivot connector connected to the first support member and the mount;

a second support member pivotably connected to the mount, wherein at least a portion of the second support member is positioned underneath the second side of the first launder cover, wherein the second support member is adjustable between a second position and a first position;

wherein the first launder cover, the first support member, and the second support member are each independently pivotable with respect to the mount;

wherein the first support member and the second support member are each adapted to support the first launder cover in the raised position when the first support member and the second support member are in the second position.

14. The launder cover system of claim 13, further comprising a second launder cover pivotably connected to the mount, wherein at least a portion of the first support member is positioned underneath the second launder cover.

15. The launder cover system of claim 14, further comprising a second pivot connector connected between the mount and the second support member.

16. The launder cover system of claim 13, further comprising a launder support connected to a channel wall of the launder channel, wherein the first launder cover is adapted to rest upon the launder support when the first launder cover is in the lowered position.

17. The launder cover system of claim 16, wherein the launder support comprises a rail on which the first launder cover rests when the first launder cover is in the lowered position.

18. A launder cover system, comprising:
a mount adapted to be connected to a tank wall of a tank;
a first launder cover pivotably connected to the mount, wherein the first launder cover is adjustable between a lowered position and a raised position, wherein in the lowered position the first launder cover is adapted to cover a launder channel of the tank, wherein in the raised position the first launder cover is adapted to expose the launder channel of the tank, wherein the first launder cover comprises a first side and a second side;

a first support member pivotably connected to the mount, wherein at least a portion of the first support member is positioned underneath the first side of the first launder cover, wherein the first support member is adjustable between a second position and a first position; and a hinge connector connected to the first launder cover and the mount; and a pivot connector connected to the first support member and the mount;

a second support member pivotably connected to the mount, wherein at least a portion of the second support member is positioned underneath the second side of the first launder cover, wherein the second support member is adjustable between a second position and a first position;

wherein the first launder cover, the first support member, and the second support member are each independently pivotable with respect to the mount;

wherein the first support member and the second support member are each adapted to support the first launder cover in the raised position when the first support member and the second support member are in the second position;

a second launder cover pivotably connected to the mount, wherein at least a portion of the first support member is positioned underneath the second launder cover;

a second pivot connector connected between the mount and the second support member;

a launder support connected to a channel wall of the launder channel, wherein the first launder cover is adapted to rest upon the launder support when the first launder cover is in the lowered position.

19. The launder cover system of claim 18, wherein the launder support comprises a rail on which the first launder cover rests when the first launder cover is in the lowered position.

* * * * *